US012736224B1

(12) United States Patent
He et al.

(10) Patent No.: US 12,736,224 B1
(45) Date of Patent: Sep. 15, 2026

(54) PRECISE ENERGY-SAVING AND TEMPERATURE CONTROL SYSTEM FOR PELLET GRILLS

(71) Applicant: Dongguan Fortress Co., Ltd., Guangdong (CN)

(72) Inventors: Yunhua He, Guangdong (CN); Yunming He, Guangdong (CN)

(73) Assignee: Dongguan Fortress Co., Ltd., Guangdong (CN)

( * ) Notice: Subject to any disclaimer, the term of this patent is extended or adjusted under 35 U.S.C. 154(b) by 0 days.

(21) Appl. No.: 19/422,767

(22) Filed: Dec. 17, 2025

(51) Int. Cl.

| | |
|---|---|
| ***F24B 13/04*** | (2006.01) |
| ***A47J 37/07*** | (2006.01) |
| ***F23B 40/00*** | (2006.01) |
| ***F23B 40/08*** | (2006.01) |

(52) U.S. Cl.
CPC .......... *F24B 13/04* (2013.01); *A47J 37/0704* (2013.01); *F23B 40/00* (2013.01); *F23B 40/08* (2013.01); *F23K 2203/202* (2013.01)

(58) Field of Classification Search
CPC ....... A47J 37/0704; F24B 13/04; F24B 1/199; F24B 40/00; F24B 40/08; F24B 40/06; F24B 50/08; F24B 50/02; F23K 2203/202; F23B 40/00; F23B 40/08; F23B 40/06; F23B 50/08; F23B 50/02
See application file for complete search history.

(56) References Cited

U.S. PATENT DOCUMENTS

| | | | | |
|---|---|---|---|---|
| 6,223,737 | B1 * | 5/2001 | Buckner | F23L 1/02 110/294 |
| 11,690,476 | B2 * | 7/2023 | Colston | A47J 37/079 126/25 R |
| 11,985,985 | B2 * | 5/2024 | Simon | A23B 4/0523 |
| 12,359,808 | B1 * | 7/2025 | Baker | F23G 7/105 |
| 2016/0255999 | A1 * | 9/2016 | McAdams | A47J 37/0754 |
| 2023/0010058 | A1 * | 1/2023 | Traeger | F23H 13/02 |

FOREIGN PATENT DOCUMENTS

| | | | | |
|---|---|---|---|---|
| GB | 2572281 A | * | 9/2019 | F23B 1/30 |

* cited by examiner

*Primary Examiner* — Allen R. B. Schult
*Assistant Examiner* — Amy E Carter
(74) *Attorney, Agent, or Firm* — Hawaii Patent Services; Nathaniel K. Fedde; Kenton N. Fedde

(57) ABSTRACT

The present disclosure relates to a precise energy-saving and temperature control system for pellet grills, comprising: a grill body; a material supply mechanism, disposed outside the grill body and communicating with the interior of the grill body, for delivering pellet fuel from the exterior into the grill body, the material supply mechanism including a first driving component for driving the fuel; a burner, for carrying and combusting the pellet fuel delivered by the material supply mechanism; and an adjusting mechanism, including a second driving component and an adjusting component connected to the burner, the adjusting component being configured to change the position of the burner under the drive of the second driving component.

15 Claims, 7 Drawing Sheets

PRECISE ENERGY-SAVING AND TEMPERATURE CONTROL SYSTEM FOR PELLET GRILLS

TECHNICAL FIELD

The present disclosure relates to the technical field of ovens, particularly to a precise energy-saving and temperature control system for pellet grills.

BACKGROUND

Currently, the heat source of pellet grills primarily relies on the combustion of wood pellets, which transfers heat to the cooking chamber through airflow, with temperature regulation achieved by the controller adjusting the feeding frequency of the pellets. Existing products commonly use traditional flat-bottom fire pots as the combustion structure. Such structures often require a large accumulation of wood pellets for successful ignition and are prone to unstable combustion with fluctuating flame sizes during operation. When applied to grills with an effective cooking area of less than 600 square inches, these flame instability and combustion adjustment lag issues are further amplified, making precise control of the in-grill temperature difficult to achieve.

For example, U.S. Pat. No. 11,486,644B1 discloses microprocessor-based controller for pellet burners. This controller implements a feedforward control scheme to provide a certain level of safety and reliability for any pellet burner. The scheme uses sensor-detected information to determine appropriate processing outcomes, leveraging feedback from proper combustion to achieve effective temperature control, thereby significantly reducing the risk of fire or explosion. However, this solution still lacks adjustment flexibility and struggles to achieve precise temperature control in practical use.

SUMMARY

The present disclosure provides a precise energy-saving and temperature control system for pellet grills to address the issues raised in the background.

To achieve the above object, the present disclosure adopts the following technical solutions:

A precise energy-saving and temperature control system for pellet grills includes: a grill body; a material supply mechanism disposed outside the grill body and communicating with an interior of the grill body for delivering pellet fuel from an exterior into the grill body, the material supply mechanism comprising a first driving component for driving the fuel; a burner for carrying and combusting the pellet fuel delivered by the material supply mechanism; an adjusting mechanism, comprising a second driving component and an adjusting component connected to the burner, the adjusting component being configured to change a position of the burner under the drive of the second driving component, thereby altering position distribution of combustion flames; a temperature detection mechanism, comprising at least one temperature sensor, for detecting an in-grill temperature; and a controller electrically connected to the temperature detection mechanism, the first driving component and the second driving component, the controller being configured to control the first driving component to adjust a supply amount of the pellet fuel and/or control the second driving component to adjust the position of the burner based on a deviation between the in-grill temperature detected by the temperature sensors and a preset target temperature, so that the in-grill temperature approaches and remains near the target temperature.

A precise energy-saving and temperature control system for pellet grills includes a grill body, with a working chamber for placing an object to be heated and a combustion chamber in thermal exchange connection with the working chamber formed inside; a material supply mechanism arranged on an outer side of the grill body and connected to the combustion chamber for delivering pellet fuel from an exterior into the combustion chamber, the material supply mechanism comprising a first driving component for driving the pellet fuel; an oxygen supply mechanism for providing adjustable combustion-supporting air to a combustion zone; a burner arranged in the combustion chamber for carrying and combusting the pellet fuel delivered by the material supply mechanism; an adjusting mechanism, comprising a second driving component and an adjusting component connected to the burner, the adjusting component being configured to change a position of the burner relative to the combustion chamber under the drive of the second driving component, thereby altering position distribution of combustion flames within the combustion chamber; a temperature detection mechanism, comprising at least one temperature sensor for detecting an in-grill temperature; and a controller electrically connected to the temperature detection mechanism, the first driving component and the second driving component, the controller being configured to control the first driving component to adjust a supply amount of the pellet fuel and/or control the second driving component to adjust the position of the burner based on a deviation between the in-grill temperature detected by the temperature sensors and a preset target temperature, so that the in-grill temperature approaches and remains near the target temperature.

The beneficial effects of the present disclosure compared to prior art are as follows:

By using the controller to compare the actual in-grill temperature obtained from the temperature sensor with the user-set target temperature and employing a PID algorithm to provide precise energy-saving material supply and accurate oxygen supply based on feeding speed, air speed, and feeding frequency at different temperature levels, the burner, through its current arc-shaped and sloped structural design, ensures timely combustion of pellets and precise oxygen supply through rational hole layout, thereby achieving accurate combustion. This generates stable and continuous heat, avoids heat supply waste through precise energy-saving supply, reduces heat supply fluctuations, delivers accurate heat to the interior of the grill, ensures minimal temperature fluctuations within the grill, and realizes precise energy-saving temperature control.

By installing a temperature sensor in the grill body of the pellet grill to detect the actual temperature in real time, the controller of the precise energy-saving and temperature control system, the first speed-adjustable motor for feeding, and the speed-adjustable fan are mounted on one side of the housing, while the burner is installed at the lower part inside the grill body. After the user sets the target temperature required for the grill body, the controller adjusts the feeding rate based on the measured current grill body temperature. The pellets enter the burner and are automatically ignited in about 3 minutes, starting heat supply. When the temperature inside the grill body reaches the set value, due to the precise energy-saving and temperature control system, the pellets are fed accurately according to the PID algorithm, ensuring precise combustion and maintaining stable heat supply temperature in the grill body.

BRIEF DESCRIPTION OF DRAWINGS

The drawings, which form part of this application, are provided to further illustrate the present disclosure. The schematic embodiments and descriptions of the present disclosure are intended to explain the present disclosure and do not constitute undue limitations. In the drawings.

Figure 1:
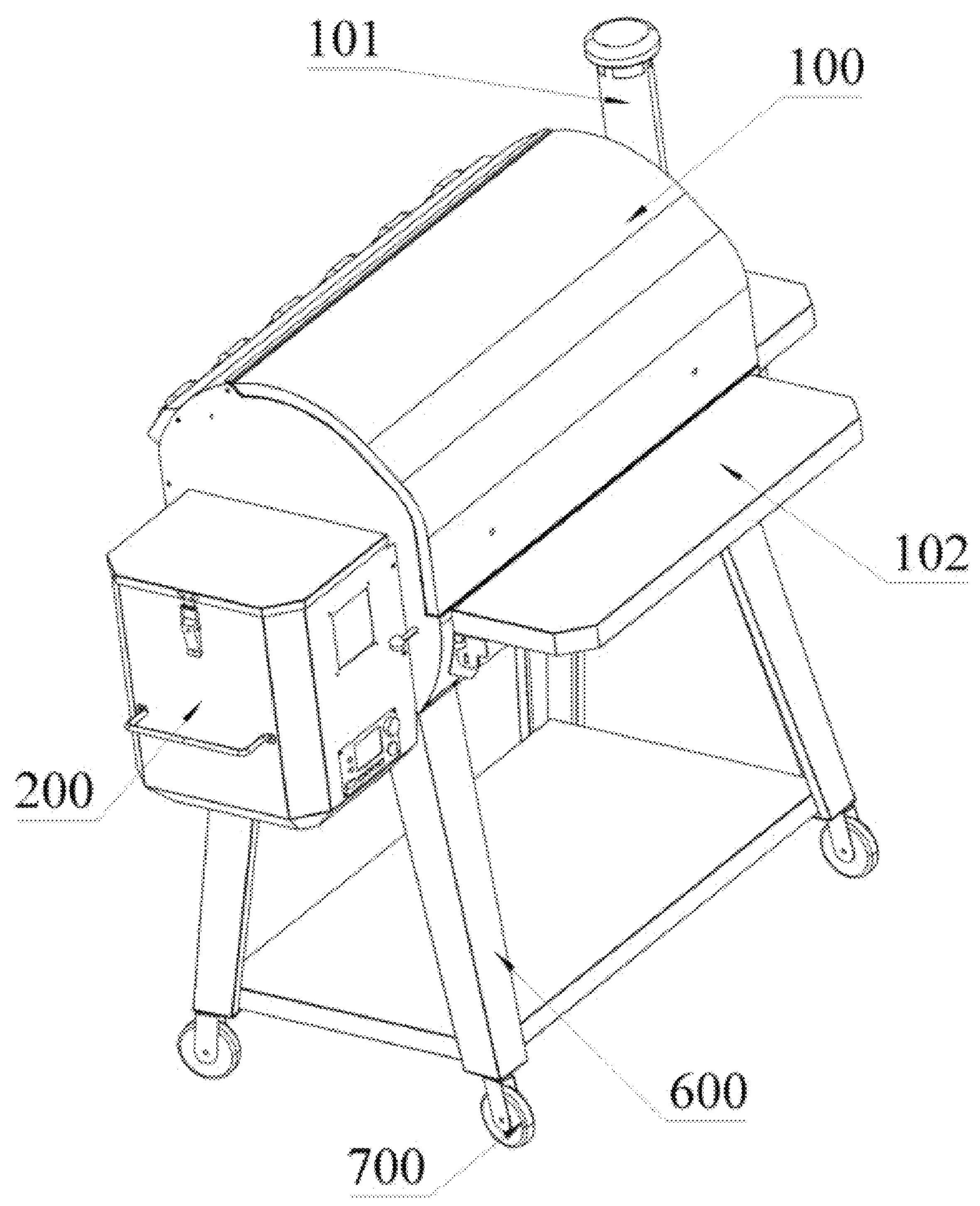
FIG. 1 is a perspective schematic view of an embodiment provided by the present disclosure.

Reference signs: grill body (100); Chimney (101); Object Placing Plate (102); Grid (103); Cover Plate (104); Object Placing Block (105); Bottom Plate (106); Material Bin (200); Feeding Pipe (201); Filter Screen (202); Top Cover (203); Housing (300); Material Shell (301); Material Supply Pipe (302); Combustion Tube (303); Vent Hole (304); Oxygen Supply Pipe (305); First Through Hole (306); Second Through Hole (307); Material Supply Mechanism (400); First Motor (401); Feeding screw (402); Adjusting Mechanism (500); Second Motor (501); Rotating Rod (502); Worm (503); Worm Wheel (504); Screw (505); Moving Plate (506); Burner (507); Support Leg (600); Caster (700).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms “comprising” and/or “including” are used in this specification, they specify the presence of features, steps, operations, equipment, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIGS. 1 to 7, a precise energy-saving and temperature control system for pellet grills includes a grill body 100, a material bin 200, a housing 300, a material supply mechanism 400, an adjusting mechanism 500, support legs 600 and casters 700. The grill body 100 is generally a rectangular box-shaped structure, composed of an outer shell plate and an inner heat-resistant lining. The top of the grill body 100 is connected to a cover plate 104 through hinges, allowing the cover plate 104 to pivot open. Users can open the cover plate 104 to place heated objects inside the grill body 100 or perform cleaning and maintenance. A plurality of object placing blocks 105 are fixed to both inner walls of the grill body 100 by welding or bolts. These object placing blocks 105 are distributed in several layers along the height direction, facilitating the installation of grids 103 at different heights. The grids 103 are detachably supported on the object placing blocks 105 and are used to carry items to be heated, such as food, workpieces, or other objects requiring heating.

A bottom plate 106 is horizontally installed near the bottom inside the grill body 100, dividing the internal space of the grill body 100 into an upper working chamber and a lower combustion chamber. The bottom plate 106 is equipped with several ventilation holes, allowing the grid 103 in the upper working chamber to exchange heat with the lower combustion chamber through these holes. This enables the heat and hot smoke generated by the combustion tube 303 in the lower housing 300 and the burner 507 of the adjusting mechanism 500 to pass through the ventilation holes, evenly heating objects placed on the upper grid 103. A chimney 101 is installed at one end of the grill body 100, connected to the upper internal space of the grill body 100 through a flue in the side wall, ensuring orderly discharge of combustion smoke and preventing it from lingering around the grill body 100.

An object placing plate 102 is hinged to the exterior of the grill body 100, connected through hinges to the side wall of the grill body 100. When unfolded, the object placing plate 102 serves as a surface for placing cooked items or temporarily holding objects; when not in use, it can be folded downward to lie nearly parallel to the outer wall of the grill body 100, minimizing space occupation. Support legs 600 are welded or screwed to the bottom of the grill body 100, with a plurality of casters 700 installed at the base of each support leg 600, each equipped with a braking mechanism. To move the grill, the brakes on the casters 700 is released and the grill body 100 is pushed to the desired position; after positioning, the casters 700 are braked to be locked, preventing accidental movement and enhancing safety.

In other embodiments (not shown), the grill body 100 can be cylindrical, oval, or polygonal in addition to the cuboid structure. The number and arrangement height of the internal grid 103 can be adjusted as needed. The ventilation holes on the bottom plate 106 may be circular, oblong, or slit-shaped, and a deflector can be added below the bottom plate 106 to improve hot airflow distribution.

Figure 2:
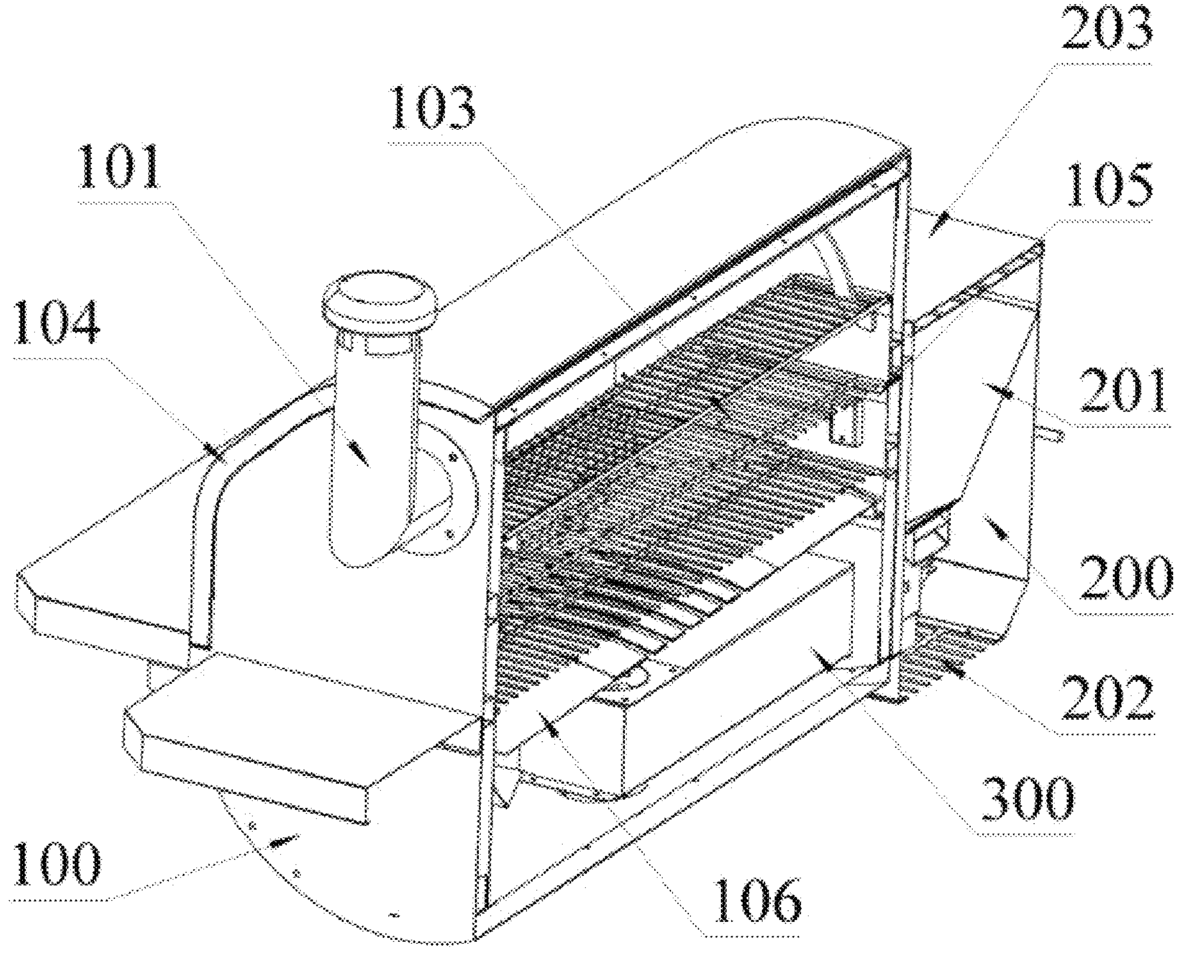
FIG. 2 is a schematic diagram of the internal structure of the grill body in the embodiment of FIG. 1.
Figure 3:
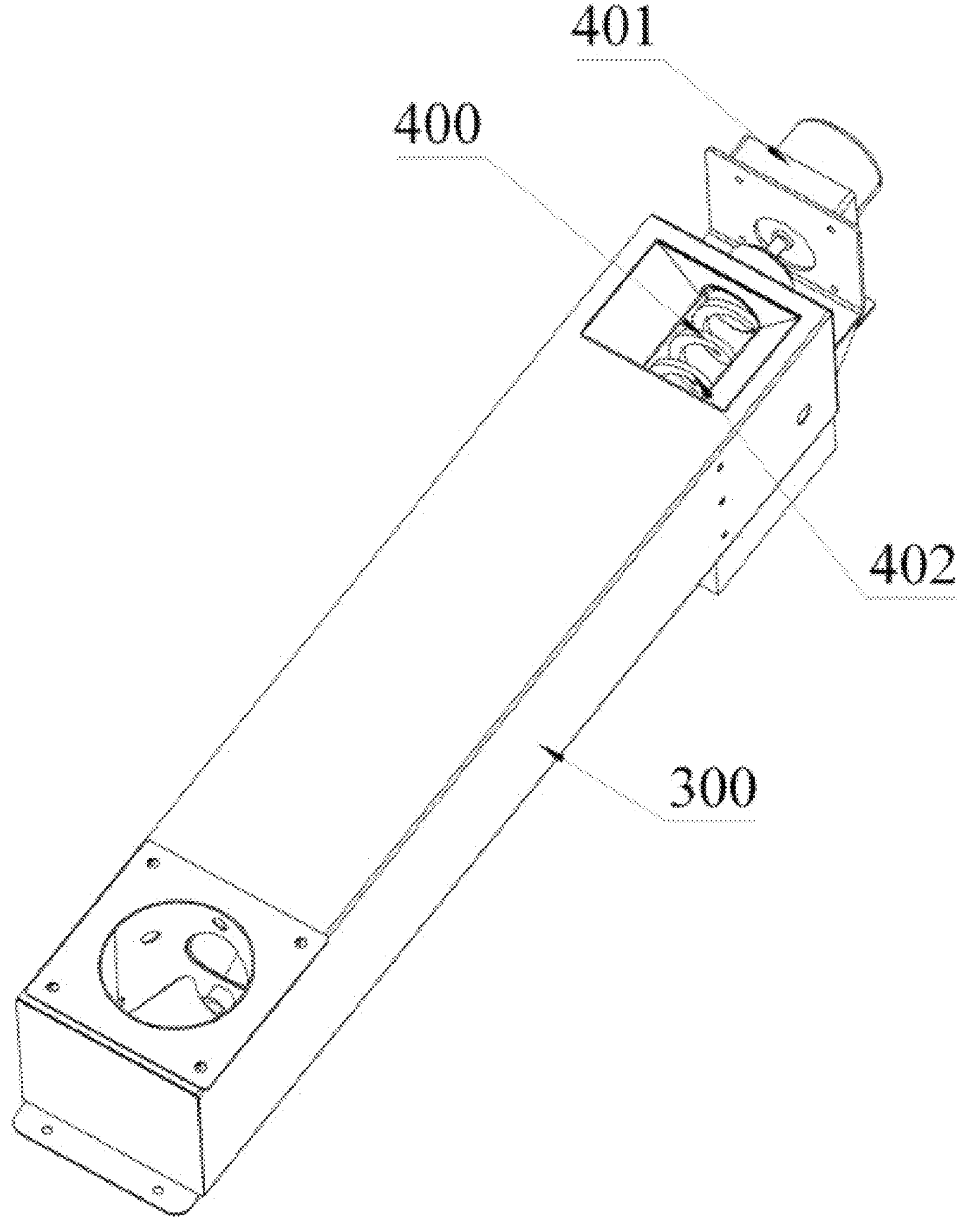
FIG. 3 is a schematic diagram of the housing structure in the embodiment of FIG. 2.
Figure 4:
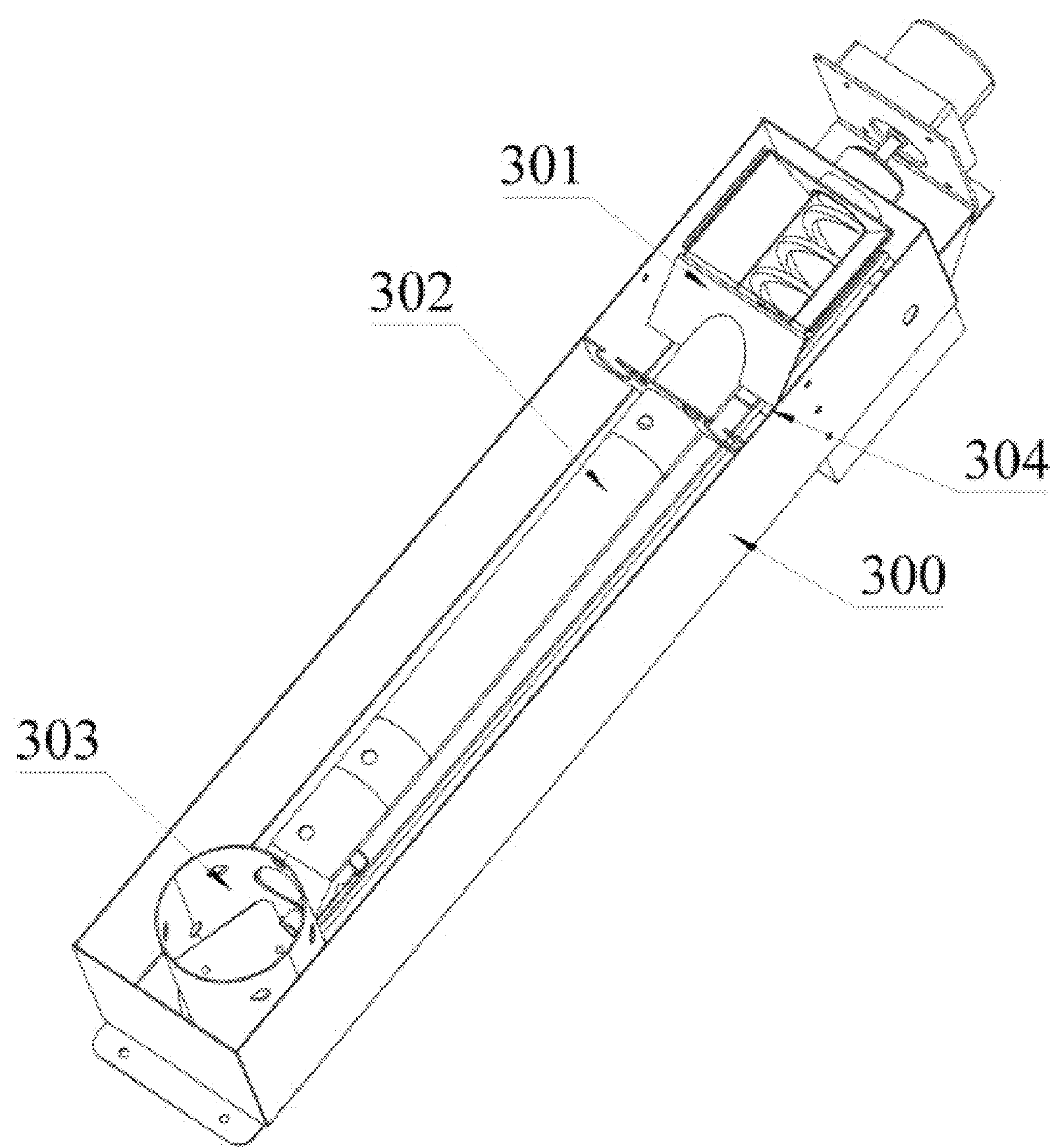
FIG. 4 is a schematic diagram of the internal structure of the housing in the embodiment of FIG. 3.
Figure 5:
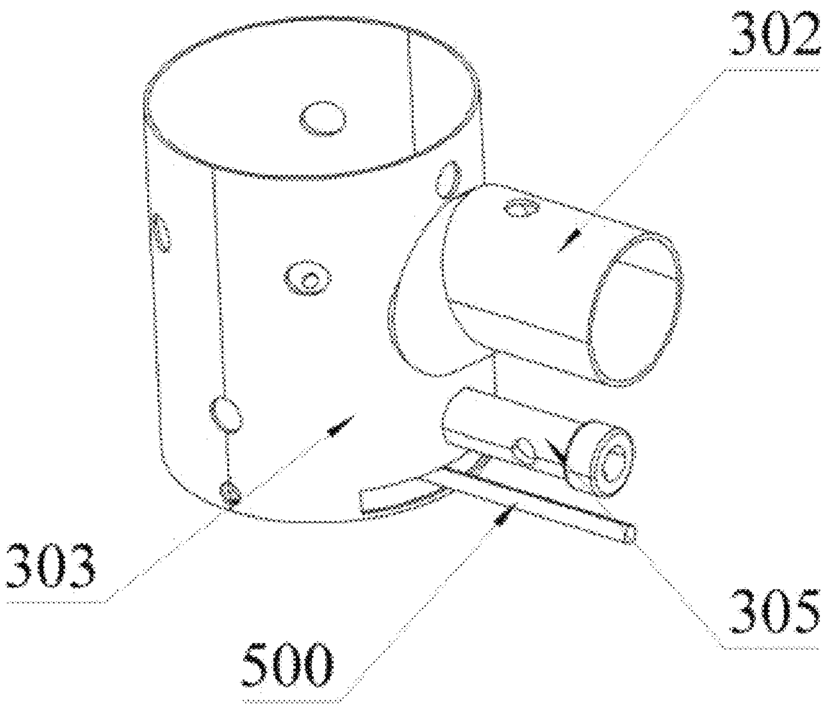
FIG. 5 is a perspective schematic view of the material supply pipe, combustion tube, and oxygen supply pipe in the embodiment of FIG. 4.

As shown in FIGS. 1 and 2, the material bin 200 is arranged at one end of the grill body 100, either fixedly connected to the grill body 100 or attached as an independent module through fasteners. The material bin 200 has a top-down feeding channel, which is the feeding pipe 201. The feeding pipe 201 has a larger opening at the top and a smaller opening at the bottom, forming a trapezoidal or conical structure to facilitate the natural downward flow of pellet fuel under gravity, concentrating it at the lower outlet. The top of the material bin 200 is connected to the top cover 203 through a hinge, allowing the top cover 203 to open and close. Users can add fuel pellets by opening the top cover 203; when closed, the top cover 203 prevents impurities from entering and reduces dust dispersion. The lower end of the feeding pipe 201 aligns with the first through hole 306 on the housing 300, enabling pellet fuel falling through the feeding pipe 201 under gravity to smoothly enter the material shell 301 inside the housing 300.

In other embodiments (not shown), besides the trapezoidal or conical structure, the feeding pipe 201 may also have ribs or turbulence structures on its inner wall to prevent pellet buildup or cavity formation. The material bin 200 can be equipped with a transparent side window or a level sensor to detect remaining pellets and trigger low-material alarms.

A filter screen 202 is installed at the bottom of the material bin 200, featuring evenly distributed small holes. A fan is placed at one end of the material bin 200, allowing external air to enter the material bin 200 after passing through the filter screen 202 under the fan's action or naturally while filtering out larger solid impurities, ensuring relatively clean air flows downstream. A controller is mounted on the exterior of the material bin 200, equipped with a display, buttons, or knobs. Users can set parameters like target temperature, operation mode, and power level through the controller, and monitor real-time temperature, operational status, and fault alerts inside the grill body 100.

It should be noted that a plurality of temperature sensors are installed at different positions within the grill body 100's cavity, such as near the central area of the grid 103, the upper interior of the grill body 100, and the chimney 101 entrance, to monitor temperature changes in real time. These temperature sensors are electrically connected to the controller through wires, transmitting measured temperature signals to the controller.

As shown in FIGS. 2 to 7, the housing 300 is fixedly installed at the bottom position inside the grill body 100. The housing 300 is internally equipped with a material shell 301, a material supply pipe 302 and a combustion tube 303. The material shell 301 is located at one end of the housing 300 and corresponds to the first through hole 306, serving to receive and temporarily store pellet fuel falling from the feeding pipe 201. The material supply pipe 302 is arranged horizontally, with one end connected to the material shell 301 and the other end connected to the combustion tube 303, transporting pellet fuel from the material shell 301 to the combustion tube 303. The combustion tube 303 is positioned at the other end inside the housing 300, with its upper part aligned with the second through hole 307 formed at the top of the housing 300. The lower part of the combustion tube 303 contains an adjustable-angle burner 507 for supporting and burning pellet fuel.

It should be noted that the first through hole 306 at the top of the housing 300 is located above the material shell 301, while the second through hole 307 is positioned above the combustion tube 303. The first through hole 306 ensures smooth feeding, while the second through hole 307 provides an upward channel for flames and high-temperature flue gas and also serves as the flame temperature detection position. A flame temperature sensor is installed above the second through hole 307 to detect the flame temperature of the combustion zone in the combustion tube 303 in real time. This data more accurately reflects combustion intensity and completeness.

Additionally, the housing 300 contains an oxygen supply pipe 305, with one end connected to the internal space of the housing 300 and the other end extending into the lower or side part of the combustion tube 303, directing air to the combustion zone near the burner 507. The oxygen supply pipe 305 improves airflow organization in the combustion zone, concentrating oxygen distribution in the pellet fuel accumulation area to enhance combustion efficiency. The bottom of the housing 300 is equipped with vent holes 304 located within the material bin 200, the vent holes 304 communicate with external air or the air outlet end of a fan, allowing air to enter the housing 300 from the material bin 200 before being directed into the combustion tube 303 through the oxygen supply pipe 305.

In other embodiments (not shown), a fan is installed at the bottom of the housing 300 or in the external air intake channel. The fan's rotational speed is controlled by the controller to achieve precise air volume regulation. When the load is high or the temperature of the grill body 100 is low, the controller can increase the fan speed to raise the oxygen supply amount and accelerate combustion. When the grill body temperature approaches or reaches the set value, the fan speed can be appropriately reduced to avoid excessive combustion and minimize energy waste.

Figure 6:
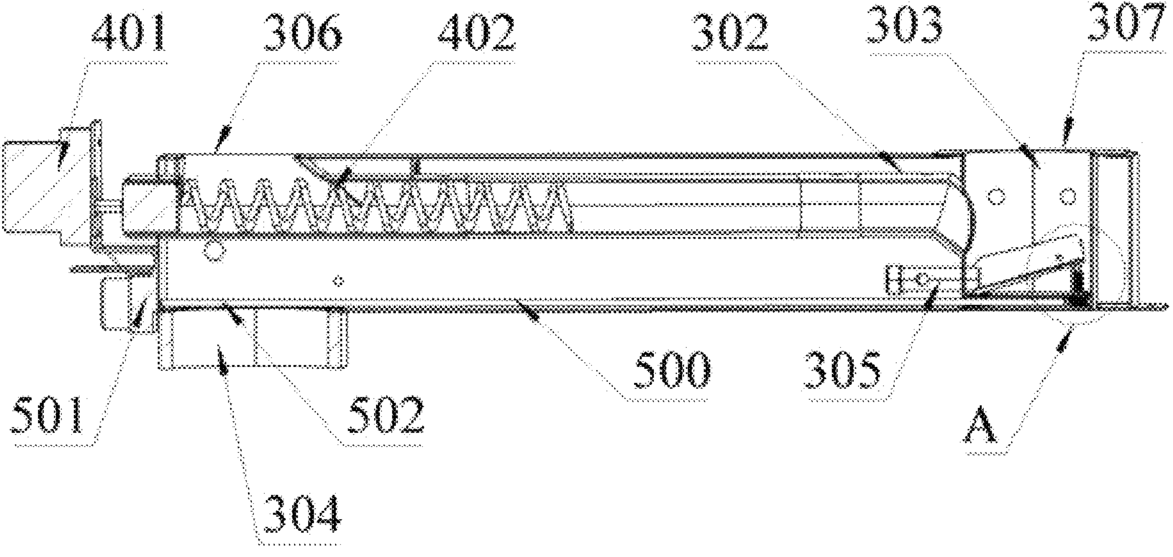
FIG. 6 is a schematic diagram of the material supply mechanism and adjusting mechanism in the embodiment of FIG. 4.

As shown in FIG. 6, the material supply mechanism 400 includes a first motor 401 and a feeding screw 402. The material supply mechanism 400 is arranged on the outer side of the housing 300 near one end of the material shell 301. The first motor 401 is mounted on the side wall of the housing 300 through a fixed bracket, with its output shaft fixedly connected to the feeding screw 402. One section of the feeding screw 402 extends into the material shell 301, while another section extends into the material supply pipe 302. When the controller determines that the combustion intensity needs to be increased based on the grill body temperature, it sends a start command to the first motor 401, which drives the feeding screw 402 to rotate at a set rotational speed. As the feeding screw 402 rotates, it pushes the combustion particles stored in the material shell 301 toward the material supply pipe 302 until they are delivered into the combustion tube 303 and fall onto the burner 507. The controller dynamically adjusts the rotational speed of the first motor 401 based on the deviation between the temperature sensor-detected temperature inside the grill body 100 and the user-set target temperature, combined with the PID algorithm, thereby changing the amount of combustion particles delivered to the burner 507 per unit time to achieve fine adjustment of the heat output.

In other embodiments (not shown), the feeding screw 402 may be designed with a plurality of sections of different pitches or a variable-pitch structure to more precisely control the feeding amount. Alternatively, a dual-screw counter-pushing configuration may be adopted to reduce the risk of particle jamming. Those skilled in the art can select an appropriate feeding structure based on specific application scenarios.

In other embodiments (not shown), the first motor 401 may be a stepper motor, servo motor, AC variable-frequency motor, or other speed-adjustable motor. The feeding screw 402 may be a single-thread, double-thread, or multi-thread structure, and its diameter and pitch may be selected based on particle density and size.

In other embodiments (not shown), a gear-type dial wheel or vibratory conveyor may replace the feeding screw 402. The controller achieves precise adjustment of the feeding amount by controlling the frequency and amplitude of the corresponding drive mechanism.

Figure 7:
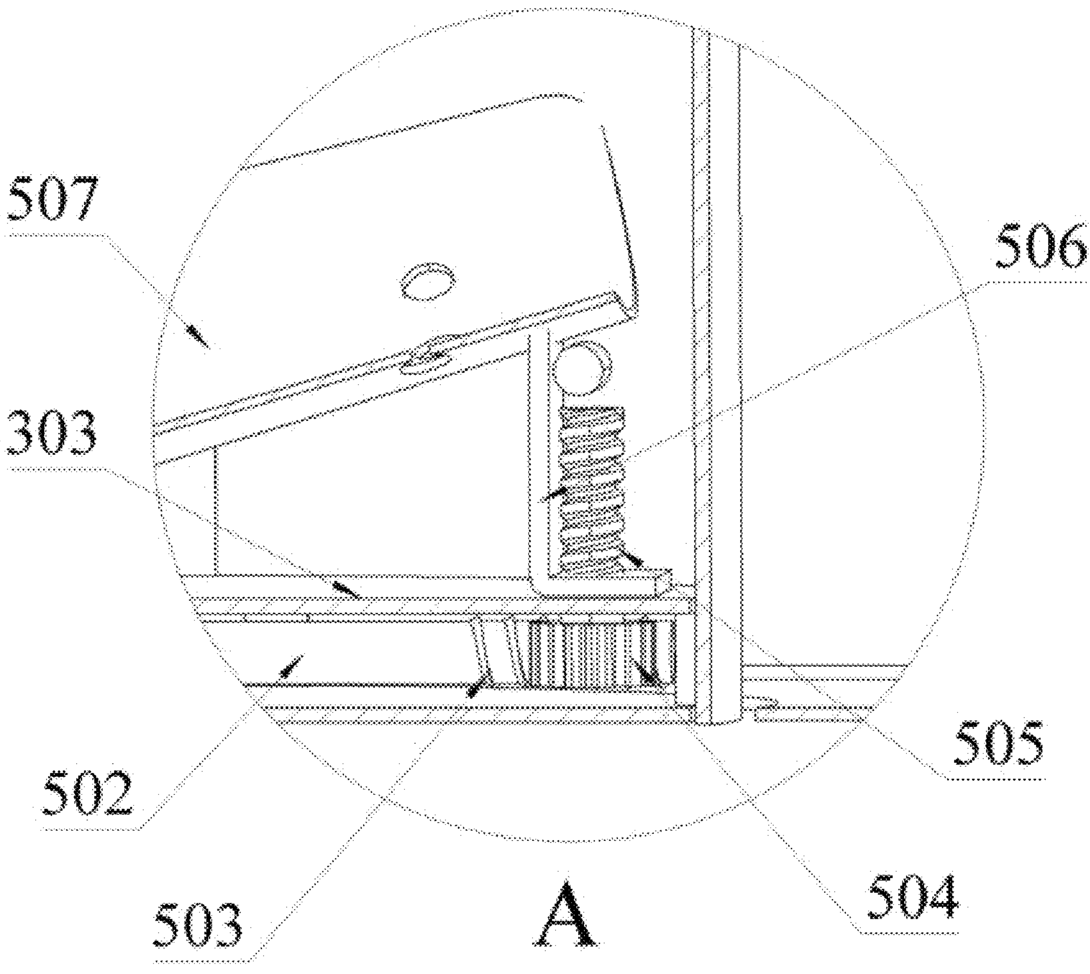
FIG. 7 is an enlarged schematic view of the A area in the embodiment of FIG. 6.

As shown in FIG. 7, the adjusting mechanism 500 includes a second motor 501, a rotating rod 502, a worm 503, a worm wheel 504, a screw 505 and a moving plate 506. The second motor 501 is mounted on the exterior of the housing 300, with its output shaft fixedly connected to one end of the rotating rod 502. The rotating rod 502 extends through the side wall of the housing 300 into its interior, and the other end of the rotating rod 502 is fixedly equipped with the worm 503 through key connection or integral molding. The bottom of the combustion tube 303 is provided with a rotating hole, in which the screw 505 is rotatably installed. The bottom of the screw 505 is fixedly connected to the worm wheel 504 through key connection or fasteners, and the worm wheel 504 meshes with the worm 503, forming a worm-worm wheel speed reduction transmission mechanism. When the second motor 501 drives the worm 503 to rotate through the rotating rod 502, the worm wheel 504 and the screw 505 rotate accordingly. The screw 505 is threaded externally to engage with the moving plate 506, which has an L-shaped structure. Since the moving plate 506 is in screw-thread fit with the moving plate 506, when the former is restricted from free rotation while the screw 505 rotates, the moving plate 506 moves axially up and down along the screw 505. The upper end of the moving plate 506 is connected to the burner 507 through a hinge, while the other end of the burner 507 is connected to the inner wall of the combustion tube 303 through a hinged structure, allowing the burner 507 to pivot around its hinge axis with the combustion tube 303, thereby adjusting its angle. The burner 507 is equipped with a plurality of through air holes to enable air from the grill body 100 to penetrate a stack layer of the pellet fuel, improving the mixing of pellet fuel with air and enhancing combustion efficiency.

It is understandable that when the controller detects a low flame temperature at the second through hole 307 through the flame temperature sensor, it controls the second motor 501 to rotate in a predetermined direction, driving the worm 503 to turn, thereby rotating the screw 505 through the worm wheel 504. As the screw 505 rotates, the moving plate 506 moves upward along the threads. Since the burner 507 is hinged to the moving plate 506 and forms another hinge joint with the combustion tube 303, the burner 507 swings upward around the hinge joint of the combustion tube 303, bringing its top closer to the second through hole 307, thus increasing the flame temperature in that area. When the flame temperature exceeds the upper limit of the set range, the controller can control the second motor 501 to rotate reversely, causing the moving plate 506 to move downward and the burner 507 to swing downward, lowering the flame's central position. This reduces the flame height and mitigates localized overheating. With this structure, the burner 507 is not only adjustable in height but can also moderately change its inclination angle as needed, optimizing the accumulation shape of combustion particles on the burner 507 and the flame morphology, further enhancing combustion stability and heat utilization efficiency.

In other embodiments (not shown), the worm 503 and worm wheel 504 in the adjusting mechanism 500 can be replaced with other speed reduction transmission mechanisms, such as a gear-rack mechanism, eccentric wheel linkage mechanism, or screw-nut mechanism, as long as they enable adjustable height and angle for the moving plate 506 and burner 507.

In addition to an arc-shaped structure, the burner 507 can also be bowl-shaped, basin-shaped, or a porous mesh structure, with small holes to allow air from the oxygen supply pipe 305 to penetrate the combustion particle pile, improving mixing and further enhancing combustion efficiency.

It should be noted that the controller is not only electrically connected to the temperature sensor, the flame temperature sensor, the first motor 401, the second motor 501, and the fan, but can also be connected to other safety protection sensors (such as grill door switch detection, overtemperature protection switch, etc.) to ensure safe system operation. When the user sets the target temperature inside the grill body 100 through the controller: the controller reads real-time temperature values from a plurality of temperature sensors and can select key measurement point temperatures to compare with the target temperature, obtaining the temperature deviation. Based on the PID algorithm, the controller calculates the target rotational speed of the first motor 401, the feeding frequency, and the target rotational speed of the fan according to the temperature deviation and its rate of change, achieving precise adjustment of the feeding amount and oxygen supply amount. Meanwhile, the controller judges whether the combustion intensity is reasonable based on the flame temperature collected by the flame temperature sensor. When the flame temperature is too low, the adjusting mechanism 500 raises the burner 507; when the flame temperature is too high, the burner 507 position is appropriately lowered to optimize flame shape and heat distribution.

After the temperature of the grill body 100 reaches the set target temperature, the controller will automatically adjust the rotational speed of the first motor 401 and the fan to lower values required to maintain the temperature, allowing the combustion pellets to burn continuously at a low, stable rate, minimizing temperature overshoot and significant fluctuations, and achieving energy-efficient operation. In practical applications, combustion pellets entering the burner 507 can complete ignition and form a stable flame within about three minutes under the action of the ignition device or igniter. Thereafter, the controller continuously adjusts the feeding speed and air volume based on feedback signals from the temperature sensor, ensuring the actual temperature inside the grill body 100 operates stably near the set temperature, thereby achieving the technical effect of "precise energy-saving and temperature control."

In other embodiments (not shown), the temperature sensor can be a thermocouple, thermistor, infrared temperature sensor, or fiber optic temperature sensor, with specific models selected based on temperature range and accuracy requirements. The control algorithm in the controller can be extended from PID to fuzzy PID control, adaptive PID control, or neural network control to further improve control performance. The controller can also be equipped with a communication interface to connect to an upper computer or mobile terminal through wired or wireless means, enabling remote monitoring and data recording.

In other embodiments (not shown), the fan may be an axial fan, centrifugal fan, or cross-flow fan, and its installation position can be at the bottom, sidewall, or an external independent air duct of the housing 300. The oxygen supply pipe 305 can also have a plurality of branches or orifices to distribute oxygen more evenly across the combustion zone.

A draft fan may be installed at the chimney 101, working in tandem with the blower structure at the bottom of the housing 300 to create a suitable positive or negative pressure combustion environment, thereby improving combustion stability. Additional features such as over-temperature protection, flame-out detection, low-fuel alarms, and power-off protection can be included to enhance system safety and reliability. Furthermore, the controller can record historical temperature curves and fuel consumption estimates, helping users optimize usage habits and maintenance.

In summary, the present disclosure achieves the following technical effects:

By using the controller to compare the actual temperature inside the grill body 100 (measured by the temperature sensor) with the user-set target temperature and employing a PID algorithm to adjust feeding speed, air velocity, and feeding frequency across different temperature levels, the system enables precise, energy-saving fuel supply and accurate oxygen delivery. The burner 507, with its current arc-shaped and sloped design, ensures timely combustion of pellets and optimal oxygen distribution through well-placed orifices, resulting in stable and consistent heat output. This precise, energy-efficient approach minimizes heat waste, reduces fluctuations in heat supply, and maintains the grill body 100's temperature within a narrow range, achieving accurate and energy-saving temperature control.

By installing a temperature sensor inside the grill body 100 of the pellet grill to monitor real-time temperature, and integrating the controller of the precise energy-saving and temperature control system with the first motor 401 adjustable in speed for feeding and the adjustable-speed fan on one side of the housing 300, while placing the burner 507 at the lower part of the grill body 100, the system operates as follows: once the user sets the target temperature for the grill body 100, the controller adjusts the feeding rate based on the current measured temperature; pellets entering the burner 507 ignite automatically in about 3 minutes and begin heating, and when the grill body 100 reaches the set temperature, the precise energy-saving control system ensures pellets are fed and burned accurately according to the PID algorithm, maintaining stable heating temperature inside the grill body 100.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A precise energy-saving and temperature control system for pellet grills, comprising:

a grill body;

a material supply mechanism disposed outside the grill body and communicating with an interior of the grill body for delivering pellet fuel from an exterior into the grill body, the material supply mechanism comprising a first driving component for driving the pellet fuel;

a burner for carrying and combusting the pellet fuel delivered by the material supply mechanism;

an adjusting mechanism, comprising a second driving component and an adjusting component connected to the burner, the adjusting component being configured to change a position of the burner under the drive of the second driving component, thereby altering position distribution of combustion flames;

a temperature detection mechanism, comprising at least one temperature sensor, for detecting an in-grill temperature; and a controller electrically connected to the temperature detection mechanism, the first driving component and the second driving component, the controller being configured to control the first driving component to adjust a supply amount of the pellet fuel and/or control the second driving component to adjust the position of the burner based on a deviation between the in-grill temperature detected by the at least one temperature sensor and a preset target temperature, so that the in-grill temperature approaches and remains near the target temperature;

wherein the material supply mechanism comprises a material bin for storing the pellet fuel and a feeding pipe extending from the material bin into the grill body;

a bottom of the feeding pipe is provided with a housing located inside the grill body, and the first driving component is a first motor disposed at one end of the housing; and an output shaft of the first motor is provided with a feeding screw, and the feeding screw pushes the pellet fuel along the feeding pipe to the burner under a drive of the first motor;

wherein the second driving component in the adjusting mechanism is a second motor, the adjusting component comprises a rotating rod connected to an output shaft of the second motor, a speed reduction transmission mechanism meshing with the rotating rod, and a moving plate in screw-thread fit with the speed reduction transmission mechanism;

one end of the burner is hinged to an inner wall of the grill body, and another end of the burner is hinged to the moving plate; and the second motor drives the speed reduction transmission mechanism to move the moving plate along a height direction, thereby enabling the burner to rotate around a hinge joint and change the position and an inclination angle of the burner.

2. The precise energy-saving and temperature control system for pellet grills according to claim 1, wherein the speed reduction transmission mechanism comprises a worm, a worm wheel and a threaded rod connected to the worm wheel, and the moving plate can reciprocate axially along the threaded rod to achieve fine adjustment of a height and an inclination of the burner.

3. The precise energy-saving and temperature control system for pellet grills according to claim 2, wherein the burner has a concave bearing surface opening upward, with a plurality of through air holes arranged on the concave bearing surface.

4. The precise energy-saving and temperature control system for pellet grills according to claim 2, wherein a partition board is arranged inside the grill body, dividing an internal space of the grill body into an upper working chamber and a lower combustion chamber; and the burner is arranged in the lower combustion chamber, and the partition board is provided with a plurality of ventilation holes, allowing heat and flue gas generated by combustion in the lower combustion chamber to enter the upper working chamber through the ventilation holes to heat an object to be heated.

5. The precise energy-saving and temperature control system for pellet grills according to claim 4, wherein the housing is arranged in the lower combustion chamber, with a material shell, a material supply pipe and a combustion tube interconnected to each other formed inside the housing; and the material shell is connected to the feeding pipe, the burner is arranged in the combustion tube, and a top of the housing is connected to the internal space of the grill body, guiding combustion flames and high-temperature flue gas through a top area of the housing into the upper working chamber.

6. The precise energy-saving and temperature control system for pellet grills according to claim 5, wherein the temperature detection mechanism comprises at least two temperature sensors arranged at different positions inside the grill body and a flame temperature sensor arranged adjacent to the combustion tube, and the controller is configured to:

obtain a representative temperature value characterizing an overall temperature inside the grill body based on temperatures detected by the temperature sensors, and compare the representative temperature value with the preset target temperature to control the first driving component; and control the second driving component to adjust the position of the burner based on temperatures of the combustion tube and a flame area detected by the flame temperature sensor to optimize flame action positions and heat distribution.

7. The precise energy-saving and temperature control system for pellet grills according to claim 6, wherein the controller, when obtaining detection values from the temperature sensors, performs weighted or comprehensive processing on temperature detection values from different positions to derive the representative temperature value, and adopts a closed-loop control method based on a PID algorithm to simultaneously adjust a rotational speed and a working cycle of the first driving component and an oxygen supply amount of a fan in an oxygen supply mechanism according to a deviation between the representative temperature value and the preset target temperature and a change trend thereof, thereby keeping the in-grill temperature fluctuating slightly around the target temperature.

8. The precise energy-saving and temperature control system for pellet grills according to claim 7, wherein a bottom of the material bin is provided with a filter screen, where external air enters through the fan and is directionally delivered into the combustion tube through an oxygen supply pipe installed inside the grill body; and the controller is electrically connected to the fan and configured to adjust a rotational speed and a working cycle of the fan based on a temperature deviation inside the grill body, thereby jointly controlling a combustion intensity in coordination with the supply amount of the pellet fuel.

9. The precise energy-saving and temperature control system for pellet grills according to claim 1, wherein a supporting structure is arranged at a bottom of the grill body, with casters equipped with a braking mechanism installed at a bottom of the supporting structure to facilitate movement and positioning of the grill body; and a foldable object placing plate is provided on an outer side of the grill body for placing cooked items when unfolded and adhering to an outer wall of grill body when folded to save space.

10. A precise energy-saving and temperature control system for pellet grills, comprising:

a grill body, with a working chamber for placing an object to be heated and a combustion chamber in thermal exchange connection with the working chamber formed inside;

a material supply mechanism arranged on an outer side of the grill body and connected to the combustion chamber for delivering pellet fuel from an exterior into the combustion chamber, the material supply mechanism comprising a first driving component for driving the pellet fuel;

an oxygen supply mechanism for providing adjustable combustion-supporting air to a combustion zone;

a burner arranged in the combustion chamber for carrying and combusting the pellet fuel delivered by the material supply mechanism;

an adjusting mechanism, comprising a second driving component and an adjusting component connected to the burner, the adjusting component being configured to change a position of the burner relative to the combustion chamber under a drive of the second driving component, thereby altering position distribution of combustion flames within the combustion chamber;

a temperature detection mechanism, comprising at least one temperature sensor for detecting an in-grill temperature; and a controller electrically connected to the temperature detection mechanism, the first driving component and the second driving component, the controller being configured to control the first driving component to adjust a supply amount of the pellet fuel and/or control the second driving component to adjust the position of the burner based on a deviation between the in-grill temperature detected by the at least one temperature sensor and a preset target temperature, so that the in-grill temperature approaches and remains near the target temperature;

the material supply mechanism comprises a material bin for storing the pellet fuel and a feeding channel extending from the material bin to the combustion chamber; and the first driving component is a first motor arranged in the feeding channel, an output end of the first motor is provided with a spiral delivering component for pushing the pellet fuel along the feeding channel to the burner under a drive of the first motor;

wherein the oxygen supply mechanism comprises a fan and an oxygen supply pipe connected to the combustion chamber, an air outlet end of the fan directs combustion-supporting air to the burner through the oxygen supply pipe, and the controller is electrically connected to the fan; and the controller is configured to adjust a rotational speed and a working cycle of the fan based on changes in the in-grill temperature, thereby jointly controlling a combustion intensity in coordination with the supply amount of the pellet fuel;

wherein the second driving component is a second motor, and the adjusting component comprises a rotating member connected to an output end of the second motor, a speed reduction transmission mechanism meshing with the rotating member and a moving member in screw-thread fit with the speed reduction transmission mechanism; and one end of the burner is hinged to an inner wall of the combustion chamber, and another end of the burner is hinged to the moving member, the second motor drives the speed reduction transmission mechanism to move the moving member along a height direction, thereby enabling the burner to rotate around a hinge joint thereof and change a height and an inclination angle of the burner relative to the combustion chamber.

11. The precise energy-saving and temperature control system for pellet grills according to claim 10, wherein the speed reduction transmission mechanism comprises a worm, a worm wheel and a threaded rod connected to the worm wheel; and the moving member is a moving plate in screw-thread fit with the threaded rod, the moving plate is restricted from rotating but capable of reciprocating axially along the threaded rod to achieve fine adjustment of the height and inclination of the burner.

12. The precise energy-saving and temperature control system for pellet grills according to claim 10, wherein the burner has a concave bearing surface opening upward, with a plurality of through air holes arranged on the concave bearing surface, allowing air delivered by the oxygen supply mechanism to penetrate a stack layer of the pellet fuel, thereby improving a mixing degree and combustion completeness of pellet fuel and air.

13. The precise energy-saving and temperature control system for pellet grills according to claim 10, wherein a partition board is arranged inside the grill body, dividing an internal space of the grill body into an upper working chamber and a lower combustion chamber; and the burner is arranged in the combustion chamber, and the partition board is provided with a plurality of ventilation holes, enabling heat and flue gas generated by combustion in the combustion chamber to enter the working chamber through the ventilation holes to heat an object to be heated.

14. The precise energy-saving and temperature control system for pellet grills according to claim 13, wherein a housing is arranged in the combustion chamber, with a material shell and a combustion tube interconnected with each other formed inside, the material shell is connected to the feeding channel, and a top of the housing is connected to the working chamber, guiding combustion flames and high-temperature flue gas through a top area of the housing into the working chamber.

15. The precise energy-saving and temperature control system for pellet grills according to claim 10, wherein support legs are arranged at a bottom of the grill body, with casters equipped with a braking mechanism installed at bottoms of the support legs, enabling a movement and positioning of the grill body; and an object placing plate is arranged on an outer side of the grill body for placing cooked items when unfolded and adhering to an outer wall of the grill body when folded to save space.

* * * * *